US008423630B2

(12) United States Patent  
Ciscon et al.

(10) Patent No.: US 8,423,630 B2  
(45) Date of Patent: *Apr. 16, 2013

(54) RESPONDING TO QUALITY OF SERVICE EVENTS IN A MULTI-LAYERED COMMUNICATION SYSTEM

(75) Inventors: Larry Ciscon, Houston, TX (US); Steven Reynolds, Houston, TX (US); F. Scott Yeager, Sugarland, TX (US)

(73) Assignee: Corps of Discovery Patent Holding LLC, Bellevue, WA (US)

( * ) Notice: Subject to any disclaimer, the term of this patent is extended or adjusted under 35 U.S.C. 154(b) by 2122 days.

This patent is subject to a terminal disclaimer.

(21) Appl. No.: 10/978,953

(22) Filed: Nov. 1, 2004

(65) Prior Publication Data

US 2005/0089044 A1 Apr. 28, 2005

Related U.S. Application Data

(63) Continuation of application No. 09/860,801, filed on May 18, 2001, now Pat. No. 6,832, 249.

(60) Provisional application No. 60/205,529, filed on May 19, 2000.

(51) Int. Cl.  
*G06F 13/00* (2006.01)

(52) U.S. Cl.  
USPC .......................................................... 709/223

(58) Field of Classification Search ................... 709/223  
See application file for complete search history.

(56) References Cited

U.S. PATENT DOCUMENTS

| 6,038,609 | A | * | 3/2000 | Geulen | 709/250 |
| 6,553,568 | B1 | | 4/2003 | Fijolek et al. | |
| 6,631,122 | B1 | | 10/2003 | Arunachanlam et al. | |
| 6,747,968 | B1 | | 6/2004 | Seppala et al. | 370/338 |
| 2003/0061338 | A1 | * | 3/2003 | Stelliga | 709/224 |

FOREIGN PATENT DOCUMENTS

| EP | 0905995 | 3/1999 |
| WO | 0191416 | 11/2001 |

OTHER PUBLICATIONS

Almesberger, et al; "Using quality of service can be simple: Arequipa with renegotiable ATM connections"; Computer Networks and ISDN Systems 30; 1998; pp. 2327-2336.  
International Search Report for application No. PCT/US01/16291, mailed Jan. 4, 2002.

(Continued)

*Primary Examiner* — Robert B Harrell  
(74) *Attorney, Agent, or Firm* — Stolowitz Ford Cowger LLP

(57) ABSTRACT

A method for providing broadband communications over a multi-layer network having a plurality of Open System Interconnection layers. The method stores information in a memory, the information indicating for each of a plurality of communication resources within the multi-layer network, one or more layers of the network with which that communication resource is associated. The method monitors the multi-layer network to detect a quality of service event that has occurred at a first of a plurality of communication resources, and in response to the monitoring, uses the information to determine a layer of the multi-layer network that is associated with the first of the plurality of communication resources. The method responds to the quality of the service event by changing provisioning of the multi-layer network at a layer that is different from the layer of the multi-layer network that is associated with the first of the plurality of communication resources.

42 Claims, 8 Drawing Sheets

OTHER PUBLICATIONS

Campbell, Andrew et al.; Integrated Quality of Service for Multimedia communications; Infocom 1993, Proceedings of the 12th Annual Joint Conference of the IRRR computer and IRRR communications Societies, vol. 2; 1993; pp. 732-739.

Campbell, Andrew et al.; Resource Management in Multimedia Communication Stacks; Fourth IEEE Conference on Telecommunications, Apr. 1993; pp. 287-295.

* cited by examiner

RESPONDING TO QUALITY OF SERVICE EVENTS IN A MULTI-LAYERED COMMUNICATION SYSTEM

CROSS-REFERENCE TO RELATED APPLICATIONS

This application is a continuation of U.S. application Ser. No. 09/860,801, filed May 18, 2001, now U.S. Pat. No. 6,832,249, which in turn was a non-provisional application based on U.S. Provisional Application Ser. No. 60/205,529, filed May 19, 2000. Both of these applications are hereby incorporated by reference, and priority is claimed to both.

FIELD OF THE INVENTION

The present invention relates generally to a communication system that operates in association with a globally accessible computer network, such as the Internet, and, more particularly, to a multi-layered communication system that is implemented with a broadband communications platform that enables quality of application service delivery and user control over the priority of information delivery flow.

BACKGROUND

The Internet has become vital to both businesses and consumers. The initial role of the Internet as an information tool has led to explosive adoption of its use; however, the massive growth of the Internet has outpaced the capabilities of its infrastructure. Content providers have moved from providing static information to distributing applications that consume large amounts of bandwidth.

The delivery of high quality service to an end user while maintaining an ability to provide a significant increase in bandwidth over a global reach is an unmet challenge of contemporary communication systems. The public Internet is plagued with user problems such as congestion (too many users) and latency (long pauses and delays) and is, therefore, unable to support an increase in communication network traffic resulting from the presence of additional users and the advent of rich media applications. Deterministic applications include, for example, media rich content, low latency applications, and other applications requiring mission critical delivery scheduling. Several causes of user problems are deliberate off-loading and routing of data traffic through congestion points, inadequate security, and lost information resulting from the currently used best-effort routing practices.

The structural layers of the Internet, which include network providers, service providers, software providers, and content providers, work independently and thereby create an infrastructure based on individual convenience and legacy systems without consideration of the interaction among the constituent participants. Telecommunication carriers have networks optimized for voice but not data. Internet Service Providers (ISPs) oversubscribe their networks in an effort to achieve or sustain profitability. The public Internet is, therefore, a fundamentally flawed model from a financial, business, and technological perspective for the delivery of low latency, high throughput applications, such as media rich content and other deterministic applications.

Moreover, the Internet has a different set of transmission issues from those faced by Local Area Networks (LANs), Metropolitan Area Networks (MANs), and Wide Area Networks (WANs). LANs include directories that authorize LAN end-users to use applications or obtain information. The directory is a baseline component of the functionality that comes with LAN connectivity. LANs have historically been more important to businesses than residences because LANs enable enterprise-wide applications. MANs facilitate the interconnection of corporate LANs between buildings in a city as well as enable the interconnection of corporate networks to a WAN for voice and data traffic. They are also the local loop infrastructure that connects end users to the Internet. WANs serve as the backbone for corporations that operate in multiple cities and are the national or global networks that connect the majority of users. Public WANs, which serve as the Internet backbone, have large amounts of available bandwidth; however, no widely used routing system exists that avoids the congestion and best efforts delivery method of today's Internet.

The Internet at numerous points has congestion that results from "peering" and commercially expedient routing policies at the peering points, such as Metropolitan Area Exchanges (MAEs), where there is no economic incentive to carry traffic over any particular equipment backbone structure. Peering routing is a consequence of the practice of multiple service providers (SPs) using their routers to exchange information transmission routes with one another. Commercially expedient routing is the practice of an SP choosing a nearest location to transfer applications, irrespective quality of service considerations. Thus, the finite number of available locations for exchanging information becomes overly congested because application routing is motivated by commercial, not quality of service control, considerations.

The Internet operates with end users by way up dial-up modems or LANs connected by an ISP local loop and thereby creates over the LAN a load that typically exceeds the speed capability of the local loop. The consequence is that simple, high capacity bandwidth within the Internet by way of any ISP of rudimentary quality of service is insufficient to create a low latency, deterministic network solution. The demands exerted on infrastructure support required by, for example, 10 million users simultaneously on line from all branches of the Internet currently present a difficult bandwidth load management challenge, which promises to worsen as broadband applications gain popularity and increase in usage.

What is needed, therefore, is a broadband communication system that can consistently deliver deterministic applications, irrespective of network-to-network architecture complications.

The present invention is directed to overcoming, or at least reducing the effects of, one or more of the problems set forth above.

SUMMARY

In one aspect of the present invention, a method for providing broadband communications over a multi-layered network having a plurality of Open System Interconnection (OSI) Reference Model layers functioning therein is provided. The method includes monitoring at least one OSI reference model layer functioning in the multi-layered network. A quality of service event is determined whether to have occurred in the multi-layered network. The quality of service event is determined to have occurred at a layer N in the OSI reference model. Network provisioning is changed at a layer less than N in response to the quality of service event, and a signal is provided when the network provisioning at the layer less than N has been changed.

In another aspect of the present invention, a system is provided. The system includes a multi-layered network, a network monitor, and a network controller. The multi-layered network has a plurality of Open System Interconnection (OSI) reference model layers functioning therein. The network monitor is coupled to the multi-layered network, and the network monitor is adapted to monitor at least one OSI reference model layer functioning in the multi-layered network, determine that a quality of service event has occurred in the multi-layer network, and determine that the quality of service event occurred at a layer N in the OSI reference model. The network controller is coupled to the multi-layered network, and the network monitor is adapted to respond to the quality of service event in the multi-layered network by changing the network provisioning at a layer less than N.

BRIEF DESCRIPTION OF THE DRAWINGS

The invention may be best understood by reference to the following description taken in conjunction with the accompanying drawings, in which like reference numerals identify like elements, and in which.

Figure 1:
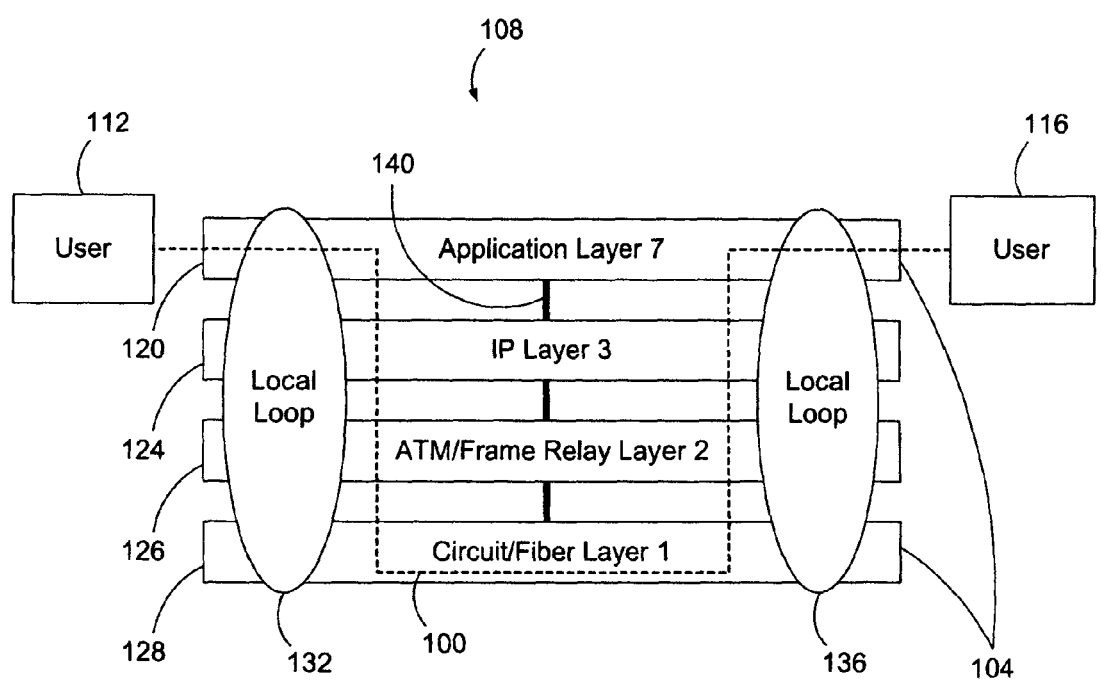
FIG. 1 illustrates a simplified prior art communication system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The broadband communication services delivery afforded by the present invention enables quality of service control by content providers, Application Service Providers (ASPs), local loop carriers, ISPs, and, by extension, their customers. This is achieved through a quality of service-capable broadband system that augments the Internet. The result is more control by users over the priority of their information flow, more control by network administrators over the congestion of their networks, and more control by content providers over costs and the experiences they provide to their users.

Referring to FIG. 1, a prior art application data flow path 100 through functional layers 104 of a communication system 108, such as the Internet, is shown. The basis of the functional layers 104 is the Open System Interconnection (OSI) model. In this model, information may be communicated between first and second users 112, 116 by traversing through the functional layers 104 as shown.

Figure 2:
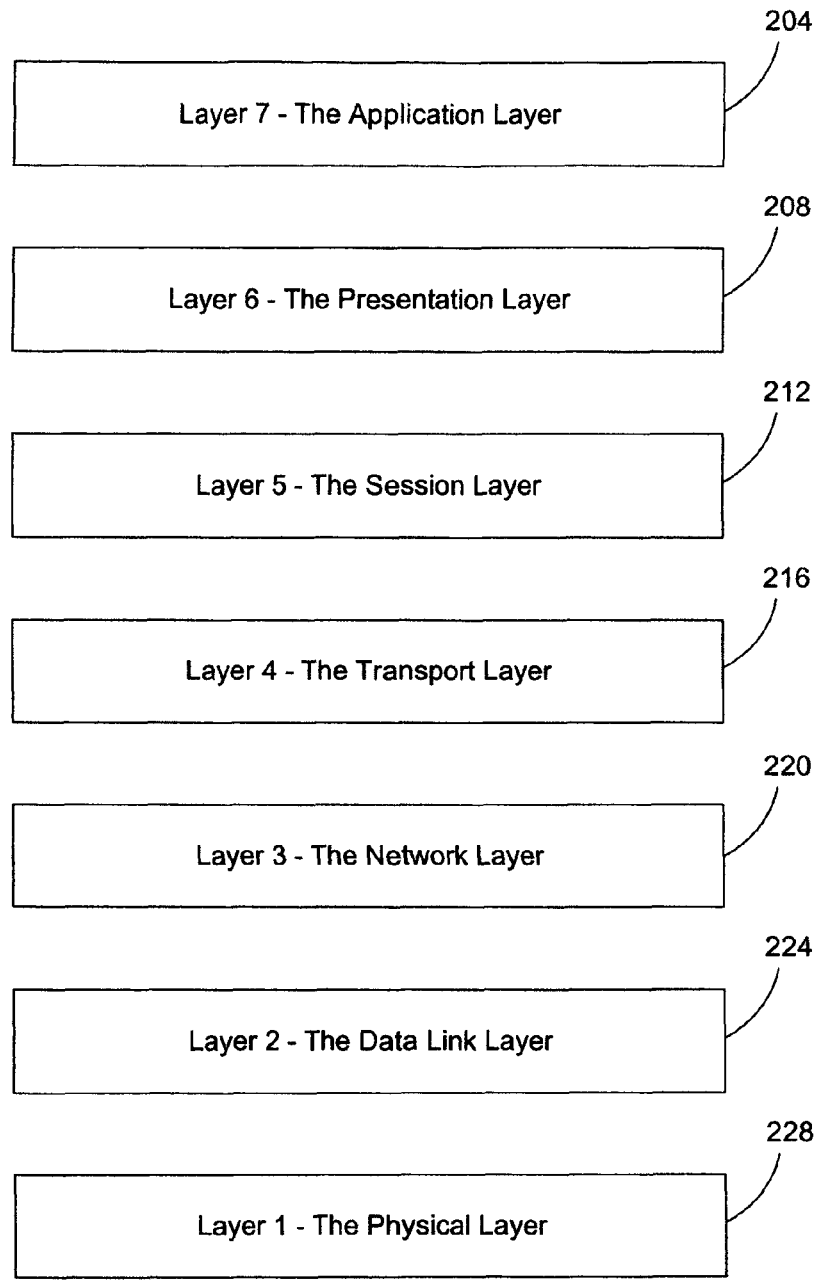
FIG. 2 illustrates the functional layers of the Open System Interconnection (OSI) reference model.

Referring to FIG. 2, an illustrative block diagram 200 of the OSI reference model is shown. Those skilled in the art will appreciate that the OSI reference model is comprised of seven separate layers (four of which are illustrated in FIG. 1.) The seven layers of the OSI model include an application layer 204, a presentation layer 208, a session layer 212, a transport layer 216, a network layer 220, a data link layer 224, and a physical layer 228. This model provides a useful reference when describing the various functions that may be involved in sending data across any communication system, such as the Internet. Moreover, those skilled in the art will appreciate that sending data across a communication system may require traversing any number of the functional layers of the OSI reference model. Furthermore, it may be appreciated that the communication resources (e.g., network devices, programs, protocols, hardware, software, etc.) in a multi-layered communication system may be described, at least in part, by where they fit in the OSI reference model.

The physical layer 228 is layer 1 in the OSI reference model. This layer encompasses the physical features of sending data over communication lines. For example, layer 1 may be associated with coaxial cables, fiber lines, category 1-5 cables, and the like.

The data link layer 224 is layer 2 in the OSI reference model. This layer encompasses procedures concentrated on the operation of communication lines. Error identification and correction are also functions of this layer. Layer 2 may include SLIP, PPP, Ethernet, and the like.

The network layer 220 is layer 3 in the OSI reference model. This layer establishes how data is transmitted between workstations, including the routing of data. Layer 3 may include IPV6, IPV4, and the like.

The transport layer 216 is layer 4 in the OSI reference model. This layer directs the processes for end-to-end transfer of information inside and between networks, including error recovery and flow control. Layer 4 may include TCP, UDP, and the like.

The session layer 212 is layer 5 in the OSI reference model. The layer controls communication resources and manages dialogue and the directions of information flow. Layer 5 may include POP/25, 532, RPC Portmapper, and the like.

The presentation layer 208 is layer 6 in the OSI reference model. This layer allows different systems to communicate by converting the information format of an individual system into a standard configuration. Layer 6 may include HTTP, FTP, SMTP, and the like.

The application layer 204 is layer 7 in the OSI reference model. This layer includes protocols for specific application services and encloses virtual terminal software. File transfer may also occur with events at the application layer. Layer 7, may include e-mail, newsgroups, web applications, and the like.

Although illustrative examples have been given for each of the 7 layers in the OSI reference model, those skilled in the art will appreciate that many other communication resources may be categorized by where their functionality fits within the OSI reference model. Moreover, some communication resources may not fit completely within one layer of the OSI reference model, that is, the functionality of some communication resources may be best categorized with reference to more than one OSI reference model layer. Nevertheless, most communication resources (e.g., routers, multiplexers, switches, data lines, application programs, software, hardware, etc.) may be substantially categorized within one of the layers of the OSI reference model.

For the ease of illustrating the present invention, the layers of the OSI reference model may be expressed algebraically. For example, layer 3, the network layer 220, may be described illustratively as layer N. If this is the case, then the layer N−1 would be layer 2, the data link layer 224, and the layer N−2 would be layer 1, the physical layer 228. Similarly, if layer 3 is again expressed as layer N, then the layers less than N would be comprised of layer 2 and layer 1. In another example, if layer 7, the application layer 204, is described illustratively as layer N, then the layer N−1 would be layer 6, the presentation layer 208. Likewise, if layer 7 is described as layer N, then the layers less than N would include layers 6 through 1.

Referring back to FIG. 1, the data flow path 100 is shown traversing 4 of the OSI functional layers 104. These layers include the application layer 120 (layer 7), the network layer 124 (layer 3), the data link layer 126 (layer 2), and the physical layer 128 (layer 1). Those skilled in the art will appreciate that the data path 100 does not necessarily have to flow through all 7 of the OSI layers, illustrated in FIG. 2, in order to facilitate a communication session between the first and second users 112, 116. Rather, the OSI layers traversed by the data flow path 100 may vary depending upon a variety of factors, such as the type of connection between the first and second users 112, 116, the topology of the communication link between the first and second users 112, 116, the geographic location of the first and second users 112 116, the particular application sending the data, and the like.

As described above, if the OSI layers 104 are expressed algebraically, in this example, layer 7 may be considered layer N, while the layers less than N may be the network layer 124 (layer 3), the data link layer 126 (layer 2), and the physical layer 128 (layer 1). Similarly, layer 3 could be considered layer N, which would make the layers less than N the data link layer 126 (layer 2) and the physical layer 128 (layer 1).

In this illustrative embodiment, each of the OSI reference model layers 104 may be implemented with an independent control system that operates under either central or distributed control. For example, the physical layer 128 (layer 1) may represent the provision of circuits that effects an end-to-end connection between the first and second users 112, 116 with an associated bandwidth, irrespective of the type of data or nature of the protocol. In the case of fiber optic cable, there may be multiple light transmissions wavelengths that provide separate information transmission channels. Carrier signal modulation and wavelength division multiplexing may also be carried out in layer 1. Layer 1 typically operates under control of a single computer that sends control signals to all devices in the layer.

The network layer 124 (layer 3) may operate internally as a distributed IP layer under dynamic routing protocols in the absence of a centralized computer. The application layer 120 (layer 7) may be a web browser sending HTTP protocol.

Additionally, the first user 112 may be connected to a first local loop 132, and the second user 116 may be connected to a second local loop 136. The local loops 132, 136 may be comprised of LANs that connect the first and second users 112, 116 to the Internet. Although FIG. 1 is being described with reference to the Internet, it is contemplated that other communication systems (e.g., private Intranets, leased lines, etc.) may be used to send data between the first and second users 112, 116.

The backbone services, which are represented by line 140, represent a WAN of multiple geographically distributed locations, the equipment of which implement segmented connectivity through the Internet. For example, each location may operate equipment under an internal switching scheme that moves locally the transmitted information up and down the OSI layers. The WAN, therefore, may represent a network implementing a geographical progression of information transmitted up and down local OSI layers, such as the OSI layers 104 illustrated in FIG. 1.

Internet users define their services offered in terms of the functional layers of the OSI model and accordingly dictate business strategies. With reference again to FIG. 1, as applications/content are sent between the first and second users 112, 116, the applications/content traverse each of the illustrated OSI layers 104 to travel from end to end of the communication system 108. Service offerings such as private communication lines (circuits) or dark fiber may be available at Layer 1, so that an application developer must determine how to make the application function with TCP/IP, and a network architect for each application and project may determine whether to use ATM or Frame Relay transmission. The product managers of the individual services, circuits, fiber, ATM, Frame Relay, or IPS services may define the particular service at the corresponding layer 104. Of course, much of this interaction occurs transparently to the first and second users 112, 116.

The carrier service at an OSI reference layer is, typically, concerned only with how the end user or enterprise connects into its network at the correct points of demarcation on the network of the carrier service at that layer. There is usually no consideration of making the application work end-to-end up and down the OSI model stack 104 in any of these carrier class services.

As a practical matter, no single OSI reference layer can resolve all of the quality of service and economic issues associated with delivering deterministic applications such as streaming media content across the local loops 132, 136 and the backbone 140 between the users 112, 116 by way of networks of multiple service providers. The application traverses up and down the OSI stack 104 and may need quality of service functions at several layers to achieve end-to-end quality of service at a price that is economical for connecting a target audience.

Typically, the applications/content source needs to use more than one service (e.g., communication circuits, ATM and Frame Relay transmission technologies) from more than one OSI layer 104 to make the application reach all of the intended audiences that are dispersed geographically in different cities and countries across the world. No consistent policy exists to ensure quality of service in this approach.

The present invention implements a different approach to the typical Internet model. The strategy of the present invention is to bridge the gaps between the layers of the OSI reference model, illustrated in FIG. 2.

Figure 3:
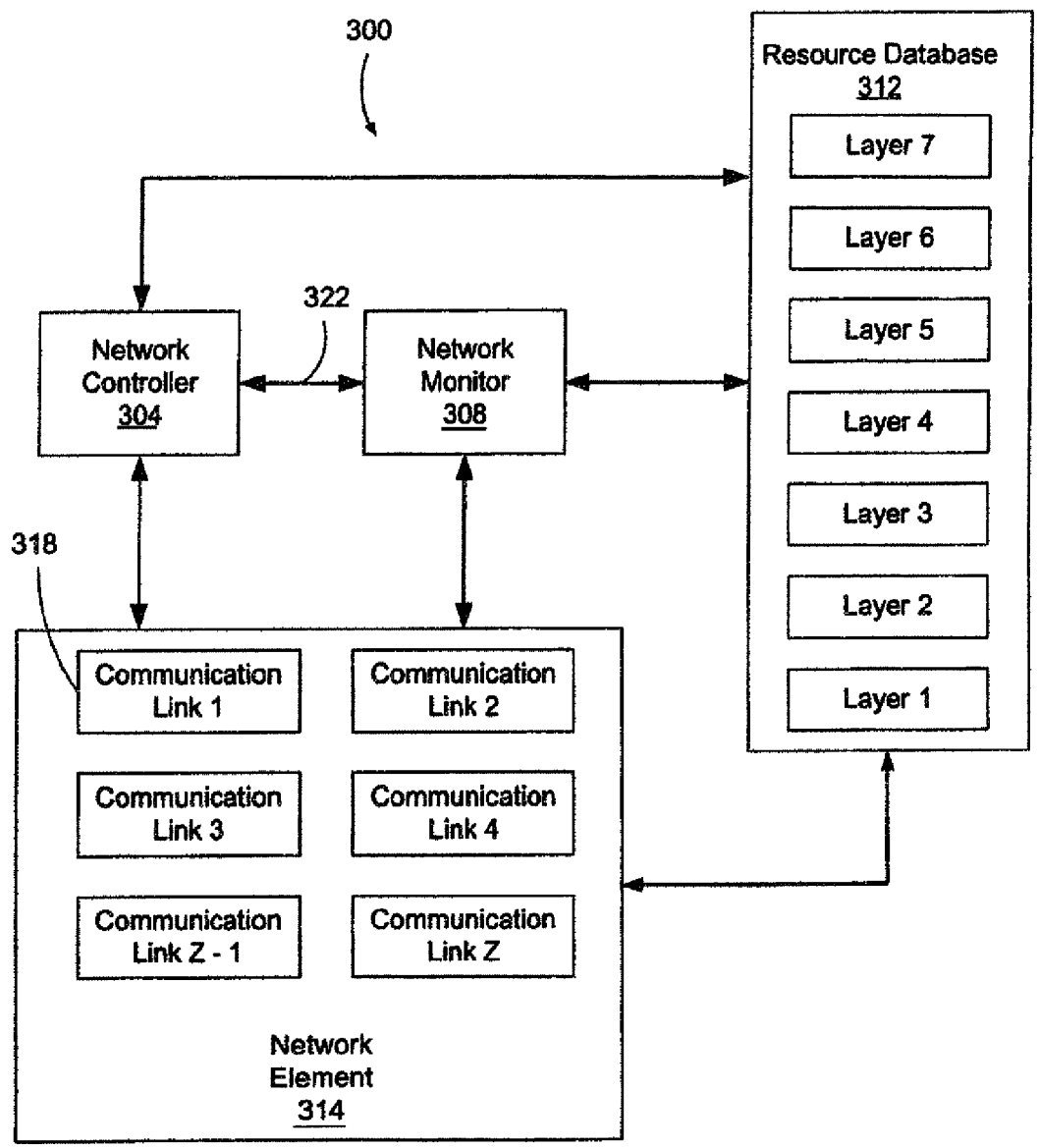
FIG. 3 is a simplified block diagram of an illustrative network control system.

Referring to FIG. 3, an exemplary network control system 300 (control system) is shown. In this illustrative embodiment, the control system 300 may be comprised of a network controller 304, a network monitor 308, and a resource database 312. The network monitor 308 may be used to monitor a network element 314, which may be interconnected with other network elements (not shown) using communication links 318. Moreover, although only one network element 314 is shown, the network monitor 308 may be coupled to a multitude of network elements 314, which may be interconnected using any number of communication links 318. Generally, the network elements 314 function as nodes in a network, and the communication links 318 may be used to interconnect the nodes. For example, in one illustrative embodiment, an exemplary network element 314 may be located in AT&T's wide area network, and the communication links 318 may be used to interconnect the network element 314 with other network elements (not shown) in AT&T's wide area network. In another embodiment, the network element 314 may be located in a private network between two locations of a corporation (e.g., between Houston and Dallas), and the communication links 318 may represent the various circuits or communication routes that interconnect the network element 314 with other network elements (not shown) in the private network. In another example, the network element 314 may be a node in the Internet, and the communication links 318 may comprise the various communication paths that interconnect the network element 314 with other network elements (not shown) in the Internet.

Although the complexities of the network monitor 308 are not shown, those skilled in the art will appreciate that the network monitor 308 may be comprised of a variety of known devices. Moreover, the specific hardware and software implementation of the network monitor 308 may vary depending upon the particular implementation. However, in one illustrative embodiment, the network monitor 308 is a Sun Netra T1 server operating using the Solaris operating system.

The resource database 312 may be used to organize the functionality of the communication links 318 and the network elements 314 according to the OSI reference model. In one illustrative embodiment, the communication resources of the network element 314 may be comprised of IP routers, ATM switches, fiber lines, application services, and the like. Accordingly, the communication resources may be organized in the resource database 312 according to their functionality within the OSI reference model. For example, ATM switches may be categorize in the resource database 312 into layer 2, fiber lines may be categorized into layer 1, and application programs may be categorized in layer 7.

The control system 300 is capable of recognizing that communication resources (e.g., routers, fiber lines, etc.) may be shared or exclusive. Accordingly, the network monitor 308 correlates the information of the various communication links 318 and presents it to the resource database 312 in a logical manner. For example, the network monitor 308 may need to combine information from communication resources at multiple OSI layers or combine information from communication resources in the same OSI layer. Moreover, the network monitor 308 may also collect topological information related to the network element 314, and this information may also be included in the resource database 312. For example, the network monitor 308 may capture the site of location of a particular router, ATM switch, fiber line, etc. and the manner in which other devices are connected to it. To this end, the network monitor 308 may use standard industry techniques, such as simple network monitoring protocol (SNMP) and remote network monitoring (RMON) to perform its monitoring and reporting to the network controller 304 and the resource database 312.

The resource database 312 may comprise a dynamic listing of communication resources that are available in any network element 314. For example, the resource database 312 may be continually updated as new resources are added to the network element 314 and as old resources are removed. Moreover, the network monitor 308 and the network controller 304 may communicate with both the resource database 312 and the network element 314 to maintain an updated organized listing of the resources available in the network element 314. Those skilled in the art will appreciate that the resource database 312 may be stored on a separate storage device comprised of a variety of known storage devices, such as hard disk drives, and the like. Alternatively, in another embodiment, the resource database 312 may be incorporated with the network monitor 308 and/or the network controller 304.

The network controller 304 may communicate with the resource database 312, the network monitor 308, and the network element 314 using a signaling network 322. Those skilled in the art will appreciate that the signaling network 322 may be comprised of a variety of devices and operate using any number of known protocols. In one embodiment, the signaling network 322 is comprised of fiber lines, and the communication protocol is IP.

The network controller 304 and the network monitor 308 may communicate with the communication links 318, over the signaling network 322, by using existing communication ports and protocols of the communication resources (e.g., network devices, programs, protocols, etc.) functioning within the respective network elements 314. In one embodiment, InterAgent® communication messaging software is a portion of the implementation of the network controller 304 and the network monitor 308. The InterAgent® software is described in the U.S. Pat. No. 5,634,010, which is hereby incorporated by reference. Moreover, the network controller 304 and the network monitor 308 may have multiple device drivers each of which provides a different command language such as command line interface (CLI), to which Cisco System routers respond; command language used by AT&T for telco switches (TL1); common open policy service (COPS), which represent priority ranking commands; and system command languages.

Although the complexities of the network controller 304 are not shown, those skilled in the art will appreciate that the network controller 304 may be comprised of a variety of known devices. Moreover, the specific hardware and software implementation of the network controller 304 may vary depending upon the particular implementation. However, in one illustrative embodiment, the network controller 304 is a Sun Netra T1 server operating using a Solaris operating system.

Furthermore, although the network controller 304, the network monitor 308, and the resource database 312 are illustrated as separate devices, the functionality of each device may be implemented within a single device. Moreover, the specific embodiment of the control system 300 may vary depending upon the particular implementation.

Figure 4:
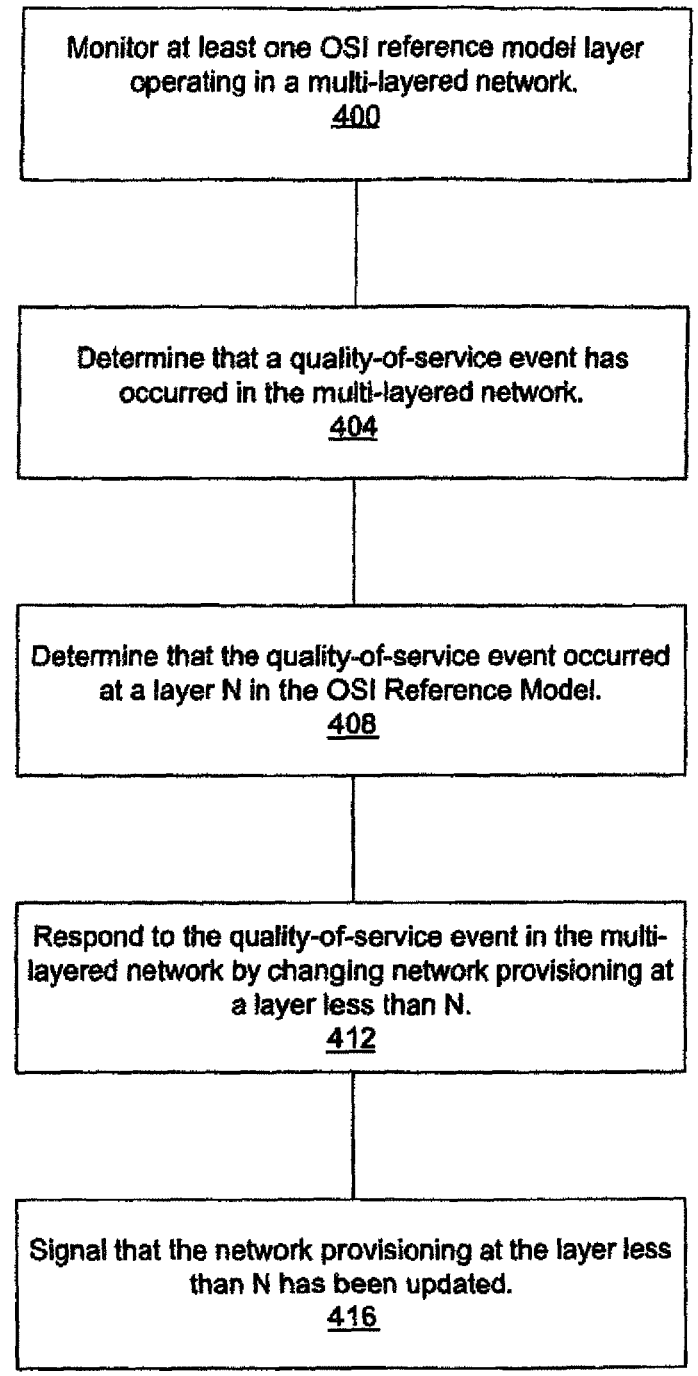
FIG. 4 is a simplified block diagram illustrating one exemplary process for the network control system, illustrated in FIG. 3, in accordance with one aspect of the present invention.

Referring to FIG. 4, a method for providing broadband communications over a multi-layered network having a plurality of OSI reference model layers functioning therein is shown. This process is discussed with reference to FIG. 3 to simplify illustrating the present invention. It should be appreciated that the configuration of the control system 300, shown in FIG. 3, is just one of many possible solutions that may be used to implement the present invention. As a result, the particular details of the control system 300, such as hardware, topography, connections, protocols, and the like, should be considered for the purpose of illustration and not for the purpose of limitation. As described above, the exact details of the control system 300 may vary depending upon the particular implementation. Furthermore, even though much of FIG. 4 will be discussed with reference to the Internet, it should be appreciated that the method depicted therein would be equally applicable to any communication system having a plurality of OSI reference model layers functioning therein.

At block 400, the control system 300 monitors at least one OSI reference model layer operating in the network element 314. As discussed above, the communication links 318 connected to each network element 314 may be categorized, in the resource database 312, according to their functional layers of the OSI reference model. Accordingly, the network monitor 308 is capable of segmenting its monitoring of the communication links 318 based on its own categorization scheme, in the resource database 312. For example, the network monitor 308 may focus its interest on the network layer (layer 3) of the OSI reference model by monitoring routers and/or any other device associated with the IP protocol. Similarly, the network monitor 308 may focus its interest on the physical layer (layer 1) of the OSI model by monitoring fiber lines, cable lines, and the like. Moreover, the network monitor 308 may focus its interest on the application layer (layer 7) of the OSI model by monitoring application programs and the like.

The monitoring process of the network monitor 308 may be proactive, reactive, or both. In one illustrative embodiment, the network monitor 308 may monitor in a proactive manner by continually poling resources associated with the OSI layer being monitored. For example, at a predetermined time interval, the network monitor 308 may send an update request to the communication resources operating in the monitored layer of the network element 314. In response, the communication resources may send the requested information back to the network monitor 308.

In another embodiment, the network monitor 308 may monitor in a more reactive mode, wherein communication resources send alert signals to the network monitor 308 when predetermined alert thresholds are met. For example, an application program (e.g., a web browser), functioning at layer 7 of the OSI reference model, may alert the network monitor 308 when it is about to send time sensitive data through the network element 314. As will be described below, once alerted, the network monitor 308 may signal the network controller 304 to take appropriate action in response to the alert from the application program.

As described above, some communication resources may be difficult to associate with a single OSI layer. Accordingly, the network monitor 308 may be required to monitor more than one OSI layer to capture an accurate state of the network element 314. To accomplish this, the network controller 304 may access the resource database 312 to determine how to monitor the resources associated with a particular network element 314. For example, regardless of how the network monitor 308 has categorized the communication resources in the resource database 312, the network monitor 308 may re-access its classification scheme from the resource database 312, and use it to facilitate monitoring the corresponding resources of a network element 314. For example, in one illustrative embodiment, the network monitor 308 may continually loop through the entries in the resource database 312, use the entries to associate communication resources with their corresponding communication links 318, and monitor the communication resources according to the classification schemes in the resource database 312.

The network monitor 308 may monitor the communication resources of the various network elements 314 searching for quality of service events. Generally, a quality of service event may be defined as any event that effects the quality of service of data being sent across a communication system. Some exemplary quality of service measurements include error seconds, unavailable seconds, packet loss rate, transmission time (latency), jitter (deviations from an expected value), bandwidth throughput, and the like.

Depending upon the implementation, the network monitor 308 may define and monitor error seconds in a variety of ways. That is, the specific error second thresholds that the network monitor 308 searches for may vary depending upon the communication system. In one example, error seconds may take on its generally accepted meaning as applied to SONET circuits. However, in another illustrative embodiment, an error second may be defined as any second in which a minimum of one and a maximum of 44 bit errors have occurred. Similarly, severely errored seconds may be defined as any second in which there have been 45 or more bit errors. Finally, unavailable seconds may be a consecutive string of 10 or more severely errored seconds. For example, 9 consecutive severely errored seconds are not unavailable seconds, but 11 consecutive severely errored seconds are also 11 unavailable seconds.

Packet loss rate may be defined as the number of packets that are sent to a particular destination but do not arrive. Again, the network monitor 308 may define any arbitrary threshold value for packet loss rate, and the particular threshold value may vary depending upon the communication system. For example, if the network monitor 308 was ensuring a very high quality of service link between two points, the packet loss rate and the error second threshold valures may be set low to ensure a high quality of service.

Transmission time (i.e., latency) may be defined as the time required to send data from a sending point to a destination point. As a practical matter, it is desirable to minimize transmission time. Jitter may be defined as deviations from the usual transmission time between the two points. For example, if a normal transmission requires 100 ms and, later, the same transmission takes 200 ms, then the jitter value for that particular communication link may be approximately 100 ms. Moreover, excessive transmission time and jitter may severely limit the ability to send rich media content across a communication link 318 (i.e., excessive transmission time and jitter may result in low quality of service) even when the communication link 318 has sufficient bandwidth for the transmission.

Bandwidth throughput is probably the most commonly used quality of service measurement. It is often defined as "the size of the pipe" between two points. For example, a DS-3 line may have a bandwidth throughput of 44.736 Mb/s, while an OC-1 line may have a bandwidth throughput of 51.84 Mb/s. Generally, a measurement of bandwidth throughput, alone, is insufficient to predict or gauge the quality of service that will be experienced between two points in a communication system. For example, even though a communication link may have a large bandwidth throughput, if the communication link produces a large value for error seconds, packet loss, or jitter, the quality of service experienced for the communication link may be very poor. As such, it may be necessary for the network monitor 308 to monitor a variety of quality of service measurements to ensure that a particular quality of service is maintained.

Referring again to FIG. 4, at block 404, the network monitor 308 may determine that a quality of service event has occurred in the network element 314. As described above, the network monitor 308 may monitor various quality of service measurements in the network element 314. Determining whether a quality of service event has occurred may vary depending upon, for example, the quality of service measurement, the OSI reference model layer being monitored, the communication link 318, and the like. However, in one illustrative embodiment, the network monitor 308 may monitor a network element 314 for severely errored seconds, and if a severely errored seconds measurement is determined to occur in the network element 314, the network monitor 308 may determine that a quality of service event has occurred.

In another illustrative example, an application program (e.g., a web browser application) functioning at layer 7 of the OSI reference model may signal the network monitor 308 that it intends to send rich media content to a particular destination in the network element 314. This signal from the application program may be considered by the network monitor 308 to be a quality of service event.

It should be appreciated that a quality of service event may occur from any functional level of the OSI reference model. For example, the quality of service event may occur from an application program (layer 7), a router (layer 3), an ATM circuit (layer 2), an add drop multiplexer (ADM) of a fiber circuit (layer 1), etc. Moreover, the network monitor 308 may determine that a quality of service event has occurred in a network element 314 using proactive, reactive, or any other measuring technique.

In addition to the quality of service measurements, a quality of service event may be the addition or deletion of communication resources in a network element 314. For example, the network monitor 308 may be used to determine when additional communication resources (i.e., fiber lines, routers, ATM circuits, ATM switches, leased lines, new routing protocols, data delivery programs, hardware, software, etc.) have been added to a particular network element 314. When this occurs, the network monitor 308 may, among other things, determine that a quality of service event has occurred in the network element 314, update the resource database 312 with the new communication resources, and alert the network controller 304 respond.

Similarly, when communication resources are removed from a network element 314, either temporarily or permanently, the network monitor 308 may initiate a similar course of action. That is, the network monitor 308 may determine that a quality of service event has occurred in the network element 314, remove the resources from the resource database 312, and alert the network controller 304 to respond.

Once a quality of service event is detected, the network monitor 308 may determine that the quality of service event occurred at a layer N in the OSI reference model (408). For example, the network monitor 308 may use the resource database 312 to determine where in the OSI reference model the quality of service event occurred. In one illustrative embodiment, the network monitor 308 may determine that a particular router is experiencing a high packet loss rate (i.e., the network monitor 308 may determine that a quality of service event has occurred). The network monitor 308 may then locate the router in the resource database 312 and determine that the quality of service event is occurring at the network layer of the OSI reference model (layer 3). Therefore, layer 3 would become layer N.

In another illustrative example, an application program may signal the network monitor 308 that it expects to send rich media content to a particular location in a network. Accordingly, the network monitor 308 may characterize the signal as a quality of service event. The network monitor 308 may then locate where in the OSI reference model the application program resides using the resource database 312. For example, the network monitor 308 may determine that the application program functions at layer 7 in the OSI reference mode. Therefore layer 7 would become layer N.

Referring back to FIG. 4, at block 412, the network controller 304 may respond to the quality of service event in the network element 314 by changing the network provisioning at a layer less than N. As described above, the resource database 312 organizes communication resources of the network element 314 according to where the communication resources fit in the OSI reference model. Additionally, the resource database 312 maintains the relationship between the various layers in the OSI model for the communication resources. For example, in one illustrative embodiment, a communication link 318, when viewed from the perspective of layer 3, may appear to be an IP path. Accordingly, the communication link 318 would be organized in the resource database 312 at layer 3. However, the IP path may also include a collection of fiber circuits that only appears to be an IP path when viewed from layer 3. Accordingly, in this illustrative example, the communication link 318 would also be organized in the resource database 312 under layer 1. The network monitor 308 and the resource database 312 maintain these relationships for all communication resources entered into the resource database 312.

In another illustrative embodiment, a communication link 318, may again appear to be solely an IP path when viewed from the perspective of layer 3. However, the IP path may also include a collection of fiber circuits, ATM circuits, leased lines, and the like. Accordingly, the communication link 318 would be organized in the resource database 312 under layer 3, layer 2, and layer 1. Again, the network monitor 308 and the resource database 312 maintain these relationships, which may be recalled upon request.

Referring back to FIG. 4, at block 408, when the network monitor 308 detects that a quality of service event has occurred in the network element 314, the network controller 304 may be called upon to respond to the quality of service event by changing the network provisioning at an OSI layer less than N (412). An illustrative example of this is shown in FIGS. 5A, 5B, and 5C.

Figure 5A:
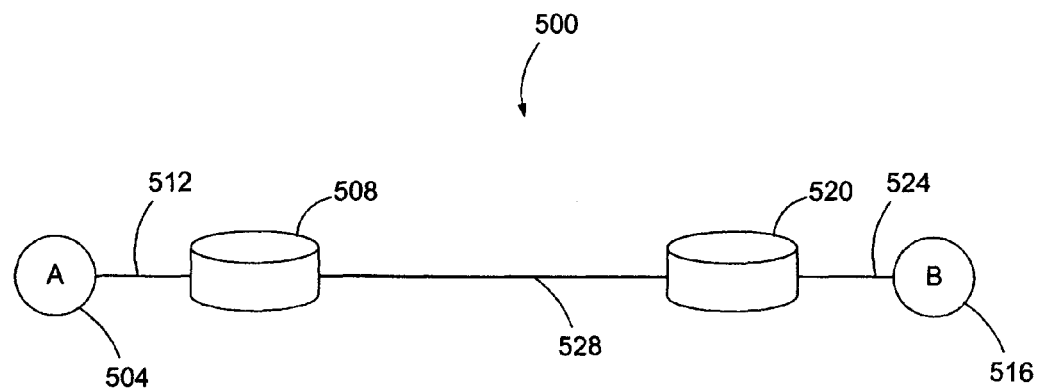
FIGS. 5A-5C illustrate an exemplary communication system when viewed from different levels of the OSI reference model.

Referring to FIG. 5A, a simplified illustrative communication system 500 is shown. It should be appreciated that much of the complexity of the communication system 500 has been removed for the purpose of simplifying the illustration of the present invention. When viewed from layer 3, the communication system 500 is comprised of a first user 504 coupled to a first router 508 over a first signaling line 512, and a second user 516 connected to a second router 520 over a second signaling line 524. A data line 528 is coupled between the first and second router 508, 520. In this embodiment, if the network monitor 308 determines that a quality of service event has occurred in the communication system 500, the network monitor 308, using the resource database 312, is likely to determine that the quality of service event has occurred at the network layer of the OSI reference model (layer 3). However, the network monitor 308 may use its knowledge of the communication system 500 and the resource database 312 to determine that the communication system 500 is actually made up of communication resources occupying different levels of the OSI reference model.

Figure 5B:
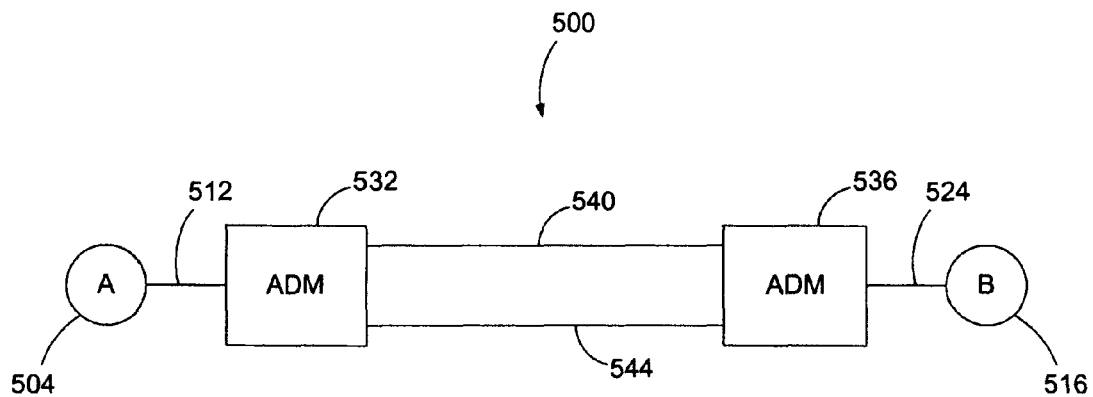

Referring to FIG. 5B, when viewed from layer 2 and layer 1 of the OSI reference model, the communication system 500 may actually include additional communication resources, such as first and second add drop multiplexers 532, 536 and first and second STM-1 lines 540, 544 each having 155 Mb/s of bandwidth (310 Mb/s total). Generally, the infrastructure of the communication system 500 residing in layer 2 and layer 1 of the OSI reference model is transparent when the communication system 500 is viewed from layer 3. That is, the first and second routers 508, 520 and the first and second users 504, 516, of FIG. 5A, may be unaware that the communication resources of FIG. 5B (e.g., ADM multiplexers, fiber lines, etc.) are used to transport data in the communication system 500. Moreover, if a quality of service event is occurring in the communication system 500, it may appear that the quality of service event is occurring at layer 3 (i.e., FIG. 5A), when the resolution to the quality of service event is really at layer 2 or layer 1 (i.e., FIG. 5B.)

Figure 5C:
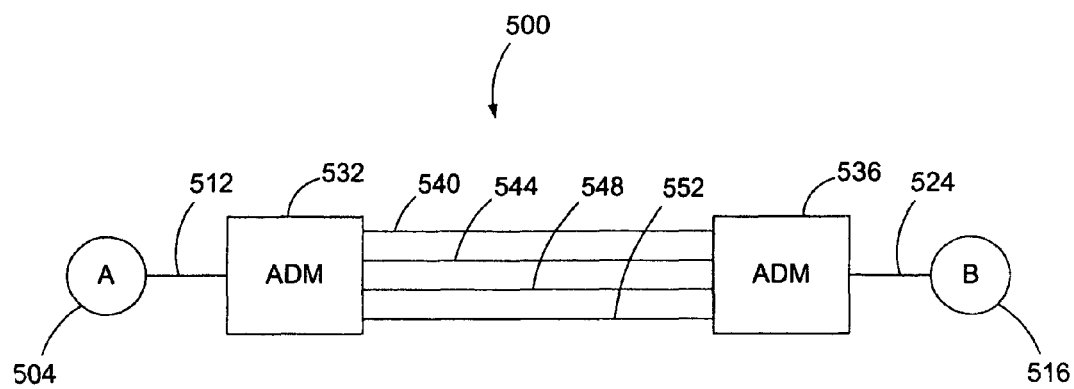

Referring to FIG. 5C, once the network monitor 308 has determined that a quality of service event has occurred at layer 3 (FIG. 5A), the network monitor 308 may signal the network controller 304 to respond to the quality of service event in the communication system 500 by changing the network provisioning at an OSI layer less than N. In this illustrative example, the OSI layers less than N are layer 2 and layer 1. In FIG. 5C, the network monitor 308 has changed the network provisioning in the communication system 500 by activating third and fourth STM-1 lines 548, 552, thus, increasing the bandwidth between the first and second users 504, 516 to 620 Mb/s.

The decision to activate the third and fourth STM-1 lines 548, 552 may be based on a variety of factors, such as the type of quality of service event, past history with the third and fourth STM-1 lines 548, 552, the characteristics of the data being sent between the first and second users 504, 516 (e.g., media rich content), and the like. For example, if the quality of service event was based on error seconds, the third and fourth STM-1 lines 548, 552 may have been activated because they were known to produce relatively few error seconds. Alternatively, the network controller 304 may base the decision on availability, that is, the network controller 304 may use the additional capacity as a hedge against future error seconds (i.e., error seconds and bandwidth may be inversely related).

In another illustrative embodiment, the quality of service event may be a signal from an application of the first user 504 that the application is about to send a large amount of data to the second user 516. In this example, the quality of service event may appear to the network controller 304 to be occurring at the application layer of the OSI reference model. Accordingly, layer N, in the OSI reference model, would become layer 7, and the layers less than N may be OSI layers 6 through 1. Using the resource database 312, the network monitor 308 may signal the network controller 304 to respond to the quality of service event by changing the network provisioning in the communication system 500 at an OSI layer less than N. As a result, the network controller 304 may take similar action, as described above, and activate the third and fourth STM-1 lines 548, 552, illustrated in FIG. 5C.

Alternatively, rather than activating the third and fourth STM-1 lines 548, 552, the network controller 304 may change the network provisioning by balancing the transmission load carried between the first and second STM-1 lines 540, 544. For example, if the first user 504 is about to send a large amount of data to the second user 516, in response to this quality of service event (i.e., a layer 7 event), the network controller 304 may adjust the load on the first and second STM-1 lines 540, 544, such that the connection between the first and second users 504, 516 is allotted additional bandwidth.

Once the transmission is complete, the application operating at the first user 504 may send an additional quality of service signal to the network monitor 308 that the transmission is compete. The network monitor 308 may then signal the network controller 304 to respond to the quality of service event, and the network controller 304 may readjust the load on the first and second STM-1 lines 540, 544 back to its previous state.

In yet another illustrative embodiment, referring back to FIG. 5A, the network monitor 308 may determine that a quality of service event has occurred in the communication system 500. As described above, the network monitor 308 is likely to determine that the quality of service event has occurred at the network layer of the OSI reference model (layer 3), and the resolution to the quality of service event is likely to be at an OSI layer less than 3. When this occurs, rather than or in addition to provisioning additional circuits between the first and second routers 508, 520, the network controller 304 may respond to the quality of service event using multiprotocol label switching (MPLS).

Generally, MPLS involves setting up a specific path for a given sequence of packets, which may be identified by a label inserted in each packet. In this example, rather than looking up the address to the next network element 314, the first or second routers 508, 520 may be able to forward the packet to its next destination based on its label. In other words, MPLS typically allows for packets to be forwarded at the layer 2 (switching) level rather than at layer 3. Thus, a quality of service event in layer 3 may be resolved by changing the network provisioning at layer 2, using MPLS.

The network controller 304 may use MPLS to respond to a layer 3 or any other OSI layer quality of service event by controlling and determining the particular route data packets traverse through a network. For example, if a quality of service event is occurring at a particular network element 314, the network controller 304 may use MPLS to route data traffic away from the problem causing network element 314. Additionally, the network controller 304 may use MPLS to balance or distribute the traffic load across the network. Furthermore, the network controller 304 may resolve a quality of service event using MPLS by ensuring that the offending data packet traverses the shortest path possible to reach its destination. Generally, there are a variety of schemes the network controller 304 may apply using MPLS to resolve a quality of service event occurring at an OSI layer greater than 2 (i.e., layers 3-7).

Referring back to FIG. 4, as described above for block 412, the network controller may respond to the quality of service event in a multi-layered network by changing the network provisioning at a layer less than N. Although this may be accomplished by provisioning an additional circuit or path, as shown in FIGS. 5B and 5C, a change in the network provisioning may occur without the addition of any new communication circuits or paths. For example, the network controller may respond to a quality of service event by changing the path of an MPLS tunnel or by changing the priority on a queue in an IP router. Accordingly, for the purpose of the present invention, any change in the configuration, operation, characteristics, properties, etc. of communication resources in a network may be described as a change in network provisioning.

At block 416, if the network provisioning has been changed at the OSI layer less than N, the network controller 304 may signal the network monitor 308 that the change in the network provisioning is complete. The network monitor 308 may then update the resource database 312 with the change in network provisioning, and the network monitor 308 may continue to monitor the network element 314, waiting for quality of service events to occur.

Figure 6A:
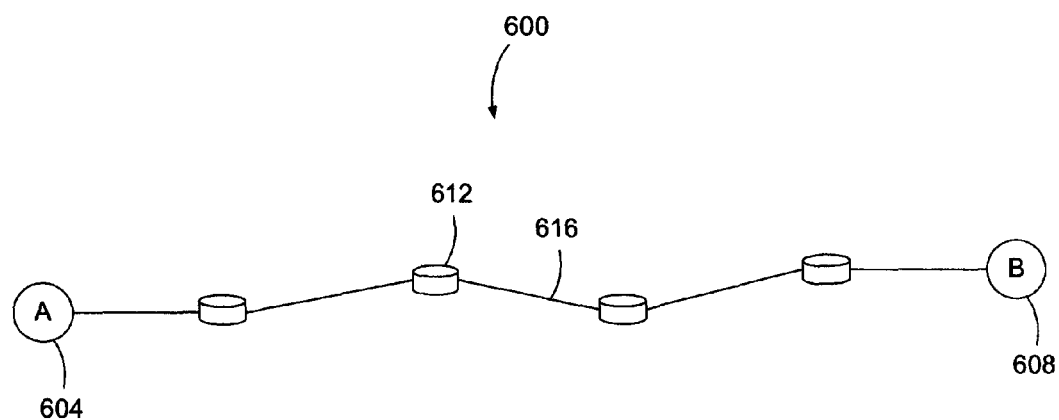
FIGS. 6A-6D illustrate another exemplary communication system when viewed from different levels of the OSI reference model.

Referring to FIGS. 6A through 6D, another illustrative example is shown. In FIG. 6A, a communication system 600 is shown connecting first and second users 604, 608. As described above, from the perspective of layer 7 and layer 3 of the OSI reference model, the communication system 600, more specifically the connection between the first and second users 604, 608, appears to be a plurality of routers 612 coupled together by a data line 616. However, referring to FIG. 6B, if the communication system 600 is viewed from layer 7, layer 3, and layer 2, of the OSI reference model, additional communication resources appear.

Figure 6B:
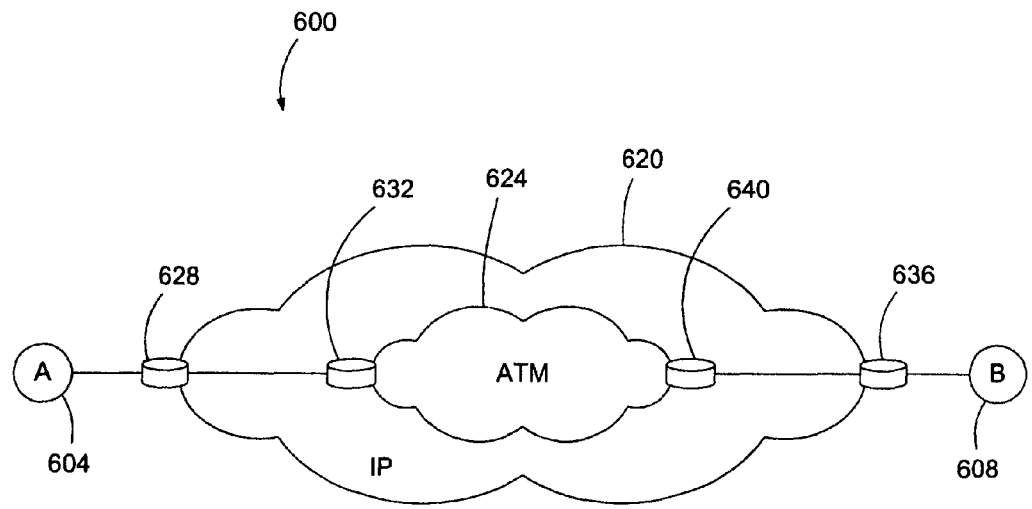

In FIG. 6B, the communication system 600 may appear, in this illustrative embodiment, as an IP cloud 620 having an ATM cloud 624 functioning therein. For example, the first user 604 may be coupled to the IP cloud 620 through a first access router 628, and the first access router 628 may be coupled to the ATM cloud 624 using a first concentrator router 632. Similarly, the second user 608 may be coupled to the IP cloud 620 through a second access router 636, and the second access router 636 may be coupled to the ATM cloud 624 using a second concentrator router 640. Again, many of the complexities of the communication system 600 have been removed to simplify illustrating the present invention.

Figure 6C:
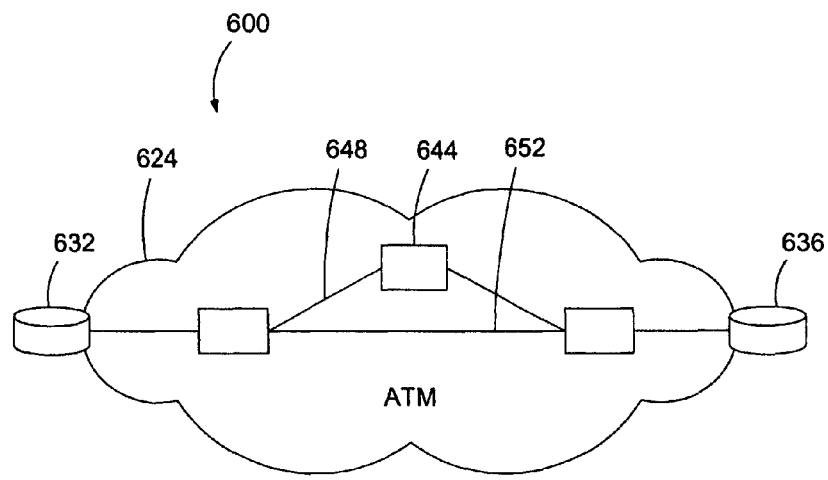

Referring to FIG. 6C, an illustrative example of the ATM cloud 624 is shown. In this example, the ATM cloud 624 is comprised of multiplexers 644 and first and second virtual circuits 648, 652. Moreover, the virtual circuits 648, 652 may be permanent virtual circuits or switched virtual circuits. As described above, if the network monitor 308 determines that a quality of service event has occurred at a layer N, the network controller 304 may respond to the quality of service event by changing the network provisioning at an OSI layer less than N.

Figure 6D:
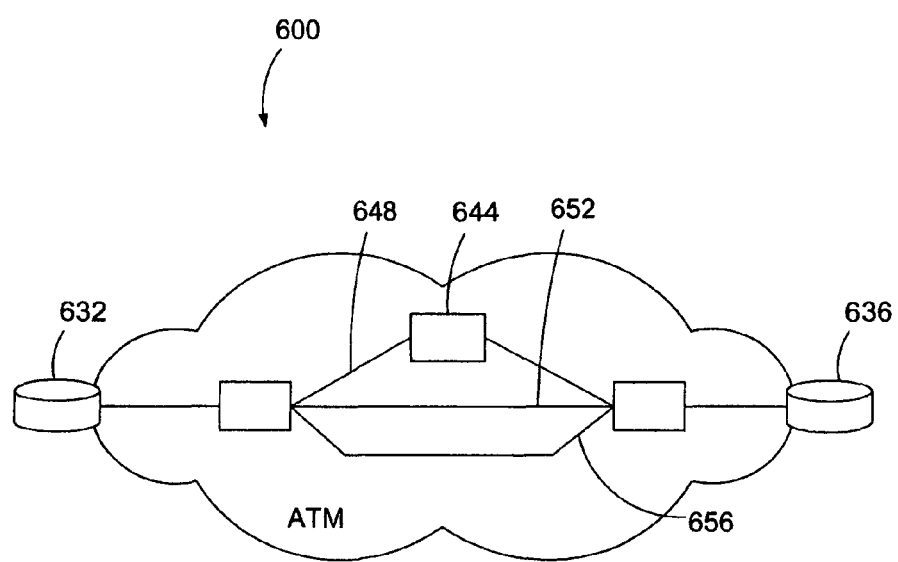
Figure 2:
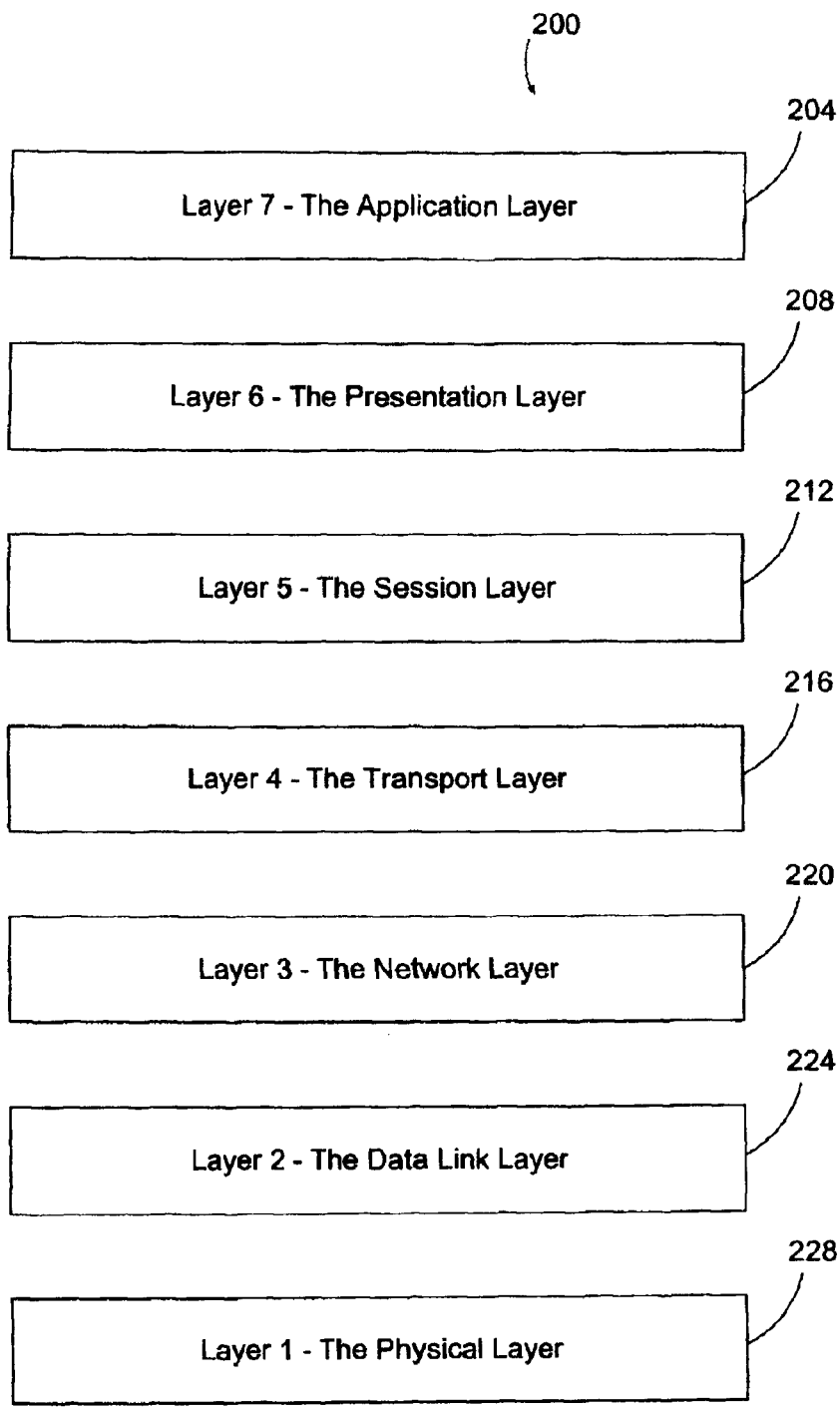

Referring to FIG. 6D, if the network monitor 308 determines that a quality of service event has occurred at OSI layer 3 (FIG. 6A), the network controller 304 may respond to the quality of service event by changing the network provisioning at layer 2 or layer 1 of the OSI model. For example, in FIG. 6D, the network controller 304 has provisioned a third virtual circuit 656 in response to the quality of service event.

In another embodiment, the quality of service event, at layer 3, may be the activation of the third virtual circuit 656. For example, as networks grow, additional communication resources are continually being brought online. When this occurs, the newly added resources (e.g., the third virtual circuit 656) may appear at layer 3 (FIG. 6A) as an increase in available throughput capacity, thus, triggering a quality of service event at layer 3. In response to the quality of service event, the network controller 304 may provision the newly added third virtual circuit 656 for communication between the first and second user 632, 636. As described above, once the change in network provisioning is complete, the network controller 304 may send a signal to the network monitor 308, and the network monitor 308 may update the resource database 312.

As indicated above, aspects of this invention pertain to specific "method functions" implementable through various computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writeable storage media (e.g., read only memory devices within a computer such as ROMs or CD-ROM disks readable only by a computer I/O attachment); (b) information alterably stored on writeable storage media (e.g., floppy disks and hard drives); or (c) information conveyed to a computer through communication media, such as a local area network, a telephone network, or a public network like the Internet. It should be understood, therefore, that such media, when carrying computer readable instructions that direct the method functions of the present invention, represent alternate embodiments of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
    storing, in a memory device, information configured to map each of a plurality of communication resources with a corresponding one of a plurality of layers of a multi-layer network;
    monitoring a first layer of the plurality of layers associated with a communication resource of the plurality of communication resources in response to the information stored in the memory device;
    identifying a second layer of the plurality of layers associated with the communication resource in response to updating the information stored in the memory device;
    switching the monitoring of the first layer to monitoring the second layer based on the identifying;
    detecting a quality of service event associated with the communication resource; and
    changing provisioning of the multi-layer network at a layer lower than the second layer in response to the quality of service event.

2. The method of claim 1,
    wherein the multi-layer network comprises a physical layer and a network layer;
    wherein the quality of service event is detected at the network layer; and
    wherein changing provisioning of the multi-layer network further comprises adding data link layer circuits in a communication link of the multi-layer network.

3. The method of claim 2,
    wherein the quality of service event at the network layer is related to an internet protocol (IP); and
    wherein changing the provisioning of the multi-layer network further comprises adding Asynchronous Transfer Mode (ATM) virtual circuits.

4. The method of claim 2,
    wherein the quality of service event at the network layer is related to an internet protocol (IP); and
    wherein changing the provisioning of the multi-layer network further comprises resolving the quality of service event using multiprotocol label switching.

5. The method of claim 1, further comprising organizing the plurality of communication resources into a classification scheme based on functionality of each of the plurality of communication resources and a reference model, wherein the classification scheme takes into account relationships between the plurality of communication resources and the reference model.

6. The method of claim 5,
    wherein the stored information comprises the classification scheme;
    wherein the detecting further comprises:
    using the information to associate each of the plurality of communication resources with a corresponding communication link in the multi-layer network; and
    monitoring the corresponding communication links in response to the classification scheme.

7. The method of claim 1, wherein the detecting of the quality of service event further comprises determining that additional communication resources have been brought online in the multi-layer network.

8. The method of claim 7, further comprising provisioning the additional communication resources to a network element in the multi-layer network, wherein the network element has a layer less than the second layer.

9. The method of claim 1,
wherein the multi-layer network comprises a physical layer and a network layer;
wherein the quality of service event is detected at the network layer; and
wherein changing provisioning of the multi-layer network further comprises adding circuits to the physical layer.

10. The method of claim 9,
wherein the quality of service event at the network layer is related to an internet protocol (IP); and
wherein changing the provisioning of the multi-layer network further comprises adding fiber optic circuits to the physical layer.

11. The method of claim 1, further comprising updating the information to indicate changes in provisioning of the multi-layer network.

12. The method of claim 1, wherein the changing provisioning of the multi-layer network is in response to the information stored in the memory device.

13. The method of claim 1, wherein the quality of service event indicates a potential risk to a quality of service for a particular communication.

14. The method of claim 1, wherein the detecting of the quality of service event further comprises determining that a communication link in the multi-layer network is exhibiting excessive packet loss.

15. The method of claim 1, wherein the detecting of the quality of service event further comprises determining that a communication link in the multi-layer network is exhibiting excessive jitter.

16. The method of claim 1, wherein the detecting of the quality of service event further comprises determining that a group of communication resources are no longer operating in the multi-layer network.

17. The method of claim 1,
wherein the multi-layer network comprises a physical layer and a network layer;
wherein the quality of service event is detected at the network layer; and
wherein changing the provisioning of the multi-layer network further comprises balancing bandwidth demands in existing physical layer circuits of the multi-layer network.

18. The method of claim 1,
wherein the multi-layer network comprises a physical layer and an application layer;
wherein the quality of service event is detected at the application layer; and
wherein changing the provisioning of the multi-layer network further comprises adding physical layer circuits in a communication link of the multi-layer network.

19. The method of claim 1, wherein said detecting uses a proactive monitoring process.

20. The method of claim 1, wherein said detecting the quality of service event further comprises using a reactive monitoring process.

21. The method of claim 1, wherein the plurality of communication resources comprises a router, a multiplexer, a switch, a data line, or an application program.

22. A system, comprising:
a memory device configured to store instructions; and
a network device configured to execute the instructions stored in the memory device to:
  instruct storing of information configured to map each of a plurality of communication resources with a corresponding one of a plurality of layers of a multi-layer network in a database;
  monitor a first layer of the plurality of layers mapped to a communication resource of the plurality of communication resources based on the information in the database;
  identify a second layer of the plurality of layers associated with the communication resource based on an update of the information in the database;
  monitor the second layer based on updated information in the database;
  detect a quality of service event at the communication resource; and
  select a new provisioning action at a layer lower than the second layer for performing the new provisioning action.

23. The system of claim 22, wherein the network device is further configured to execute the instructions stored in the memory device to organize the plurality of communication resources into a classification scheme based on functionality of each of the plurality of communication resources and a reference model, wherein the classification scheme takes into account relationships between the plurality of communication resources and the reference model.

24. The system of claim 23, wherein the network device is further configured to execute the instructions stored in the memory device to update the information stored in the database to indicate when additional communication resources have been brought online.

25. The system of claim 22,
wherein the multi-layer network comprises a data link layer and a network layer; and
wherein the network device is further configured to execute the instructions stored in the memory device to add a data link layer circuit to the data link layer in response to the quality of service event occurring at the network layer.

26. The system of claim 22,
wherein the multi-layer network comprises a physical layer and a network layer; and
wherein the network device is further configured to execute the instructions stored in the memory device to add a physical layer circuit to the physical layer in response to the quality of service event occurring at the network layer.

27. The system of claim 22,
wherein the multi-layer network comprises a data link layer and an application layer; and
wherein the network device is further configured to execute the instructions stored in the memory device to add a data link layer circuit in response to the quality of service event occurring at the application layer.

28. The system of claim 22,
wherein the multi-layer network comprises a physical layer and an application layer; and
wherein the network device is further configured to execute the instructions stored in the memory device to add a physical layer circuit to the physical layer in response to the quality of service event occurring at the application layer.

29. The system of claim 22,
wherein the multi-layer network comprises a network layer and an application layer; and
wherein the network device is further configured to execute the instructions stored in the memory device to configure network elements of the network layer in response to the quality of service event occurring at the application layer.

30. The system of claim 22, further comprising monitoring the plurality of communication resources of the multi-layer network using a proactive monitoring process or a reactive monitoring process, or any combinations thereof.

31. The system of claim 22, wherein the quality of service event indicates a potential risk to a quality of service for a particular communication.

32. A method, comprising:
storing information in a memory device, wherein the information is configured to associate each of a plurality of communication resources with a corresponding one of a plurality of layers of a multi-layer network;
updating the information to modify associations of the plurality of communications resources to the plurality of layers;
modifying monitoring of the multi-layer network responsive to the updating;
determining that a quality of service event has occurred at a first communication resource associated with a layer of the multi-layer network; and
conveying information indicative of the quality of service event to a second communication resource that is configured to respond to the quality of service event by changing provisioning of the multi-layer network at a layer lower than the layer associated with the first communication resource.

33. The method of claim 32, further comprising organizing the plurality of communication resources into a classification scheme based on functionality of each of the plurality of communication resources and a reference model, wherein the classification scheme takes into account relationships between the plurality of communication resources and the reference model.

34. The method of claim 33,
wherein the information comprises the classification scheme; and
wherein determining that the quality of service event has occurred further comprises:
using the information to associate each of the plurality of communication resources with at least one corresponding communication link in the multi-layer network; and
monitoring the at least one corresponding communication link according to the classification scheme.

35. The method of claim 32, wherein the quality of service event indicates a potential risk to a quality of service for a particular communication.

36. A method, comprising:
a computer system within a multi-layer network accessing information that maps each of a plurality of communication resources with a corresponding one of a plurality of layers of the multi-layer network;
the computer system monitoring a first layer of the plurality of layers associated with a communication resource of the plurality of communication resources in response to the accessing information stored in a memory device;
the computer system identifying a second layer of the plurality of layers associated with the communication resource in response to accessing updated information mapping the communication resource to the second layer;
the computer system switching the monitoring of the first layer to monitoring the second layer based on the identifying;
in response to the switching the monitoring, detecting that a quality of service event has occurred at the communication resource; and
the computer system changing provisioning of the multi-layer network at a layer less than the second layer in response to the detecting.

37. The method of claim 36, wherein the quality of service event indicates a potential risk to a quality of service for a particular communication.

38. The method of claim 36,
wherein the quality of service event occurs at an application layer of the multi-layer network; and
wherein changing the provisioning comprises adding physical layer circuits to a physical layer in a communication link of the multi-layer network.

39. An apparatus, comprising:
a memory device configured to store information mapping each of a plurality of communication resources with a corresponding one of a plurality of layers of a multi-layer network; and
a network monitor configured to:
change monitoring of the multi-layer network to detect quality of service events responsive to updated information in a database mapping each of a plurality of communication resources with a plurality of layers of a multi-layer network;
detect a quality of service event occurring at a communication resource; and
change provisioning of the multi-layer network at a lower layer than a layer mapped to the communication resource in response to the quality of service event.

40. The apparatus of claim 39, wherein the network monitor is further configured to determine the quality of service event occurring at an application layer of the multi-layer network.

41. A computer-readable storage device comprising computer-executable instructions stored thereon that configure a processing device to perform operations comprising:
storing, in a memory device, first information configured to map each of a plurality of communication resources with a corresponding one of a plurality of layers of a multi-layer network;
monitoring a first layer of the plurality of layers associated with a communication resource of the plurality of communication resources responsive to the information stored in the memory device;
updating the information stored in the memory device;
identifying a second layer of the plurality of layers associated with the communication resource responsive to the updated information;
monitoring the second layer responsive to the identifying;
detecting a quality of service event at the second layer; and
changing provisioning of the multi-layer network at a layer that is lower than the second layer in response to the detecting the quality of service event.

42. A system, comprising:
means for storing information configured to associate a communication resource with a layer of a multi-layer network;

means for modifying monitoring the multi-layer network responsive to updating the information to identify a second layer associated with the communication resource;

means for detecting quality of service events corresponding to the means for modifying the monitoring;

means for analyzing the updated information, in response to the means for monitoring, for determining that a quality of service event has occurred at the communication resource; and means for responding to the quality of service event by changing provisioning of the multi-layer network at a layer that is different from the second layer.

* * * * *

UNITED STATES PATENT AND TRADEMARK OFFICE
CERTIFICATE OF CORRECTION

PATENT NO. : 8,423,630 B2
APPLICATION NO. : 10/978953
DATED : April 16, 2013
INVENTOR(S) : Ciscon et al.

It is certified that error appears in the above-identified patent and that said Letters Patent is hereby corrected as shown below:

In the Drawings:

Delete Drawing sheet 2, and replace with Drawing Sheet 2. (attached)

In the Specifications:

In Column 3, Line 53, delete "developers" and insert -- developers' --, therefor.

In Column 4, Line 59, delete "Layer 7," and insert -- Layer 7 --, therefor.

In Column 10, Line 26, delete "valures" and insert -- values --, therefor.

Signed and Sealed this
Twenty-seventh Day of August, 2013

Teresa Stanek Rea
*Acting Director of the United States Patent and Trademark Office*